United States Patent [19]

Ekstedt et al.

[11] 4,109,459

[45] Aug. 29, 1978

[54] DOUBLE WALLED IMPINGEMENT COOLED COMBUSTOR

[75] Inventors: Edward E. Ekstedt; Edwin J. Beck, Jr.; Donald W. Bahr, all of Cincinnati, Ohio; Barry Weinstein, Georgetown, Mass.

[73] Assignee: General Electric Company, Cincinnati, Ohio

[21] Appl. No.: 551,545

[22] Filed: Feb. 21, 1975

Related U.S. Application Data

[63] Continuation of Ser. No. 490,098, Jul. 19, 1974, abandoned, which is a continuation of Ser. No. 305,520, Nov. 10, 1972, abandoned.

[51] Int. Cl.² .................................................. F02C 7/18
[52] U.S. Cl. ...................................... 60/39.66; 431/352
[58] Field of Search ........................... 60/39.65, 39.66; 431/351, 352, 353

[56] References Cited

U.S. PATENT DOCUMENTS

| 2,958,194 | 11/1960 | Bayley | 60/39.65 |
|---|---|---|---|
| 3,349,558 | 10/1967 | Smith | 60/39.65 |
| 3,369,363 | 2/1968 | Campbell | 60/39.65 |
| 3,570,241 | 3/1971 | Alexander | 60/39.66 |
| 3,777,484 | 12/1973 | Dibelius et al. | 60/39.65 |
| 3,826,082 | 7/1974 | Smuland et al. | 60/39.66 |

FOREIGN PATENT DOCUMENTS

| 1,957,147 | 6/1970 | Fed. Rep. of Germany | 60/39.65 |
|---|---|---|---|
| 1,270,889 | 6/1968 | Fed. Rep. of Germany | 60/39.66 |
| 1,060,097 | 2/1967 | United Kingdom | 60/39.66 |
| 200,964 | 12/1968 | U.S.S.R. | 60/39.65 |

Primary Examiner—Robert E. Garrett
Attorney, Agent, or Firm—Henry J. Policinski; Derek P. Lawrence

[57] ABSTRACT

A combustor for use in a gas turbine engine is provided with a first wall defining a combustion zone; an outer casing partially defining a cooling plenum about the first wall; a second wall spaced apart from the first wall and defining together therewith a second plenum, the second wall bearing a plurality of perforations for passing fluid from the first plenum in impinging streams upon the first wall; and a plurality of ribs extending between the first and second walls and compartmentalizing the second plenum. The ribs add substantial stiffness to the combustor as well as providing for independently controlled cooling of the substantially isolated compartments formed thereby. The impinging streams provided by the perforations in the second wall substantially increase local fluid velocities and conductive heat transfer.

5 Claims, 3 Drawing Figures

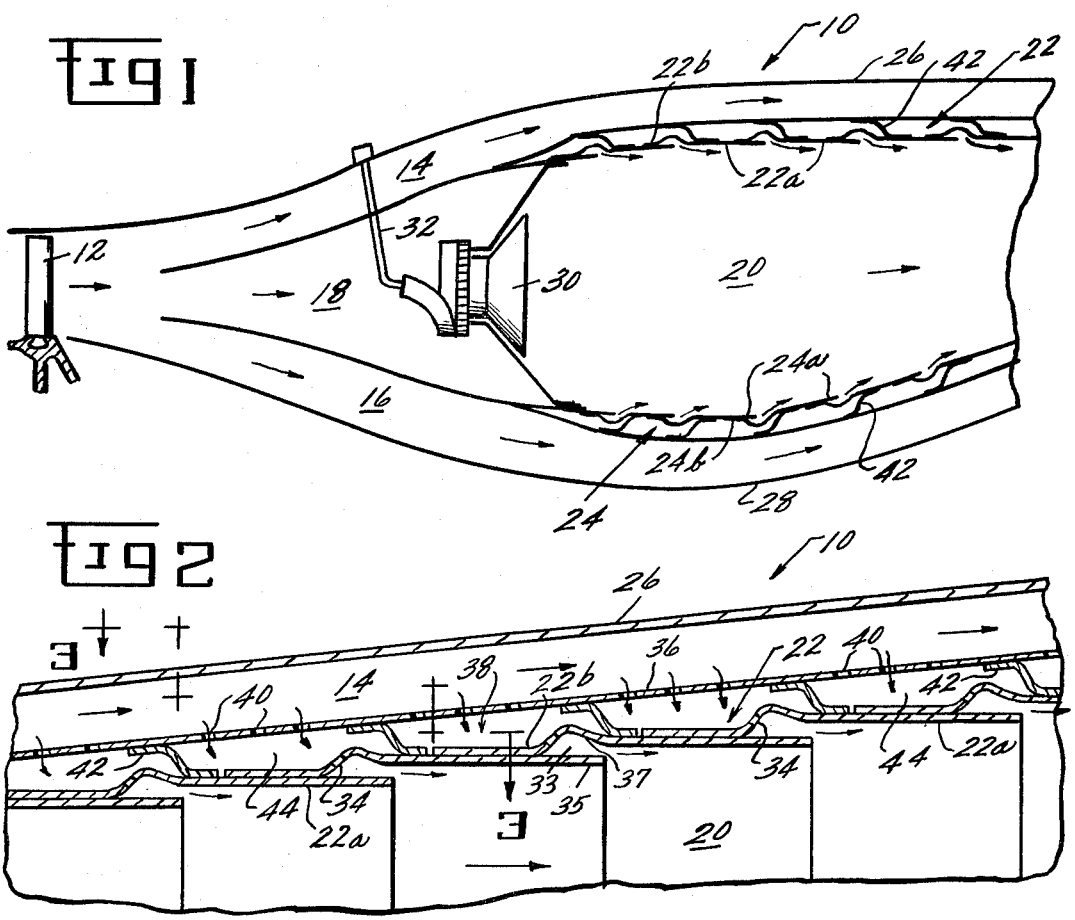
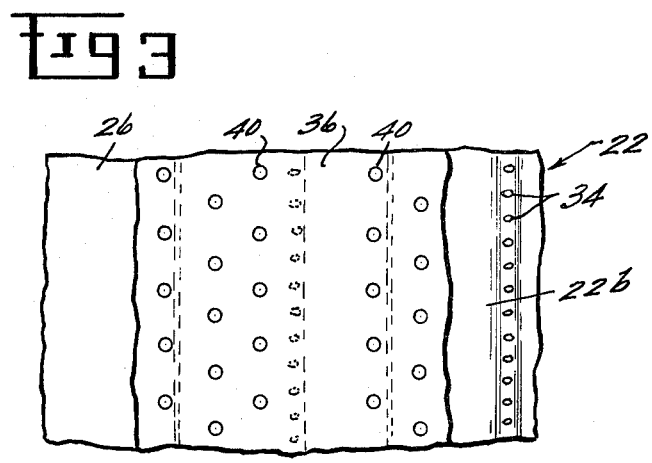

DOUBLE WALLED IMPINGEMENT COOLED COMBUSTOR

This is a continuation of application Ser. No. 490,098, filed July 19, 1974, now abandoned, which was a continuation of application Ser. No. 305,520 filed Nov. 10, 1972, now abandoned.

BACKGROUND OF THE INVENTION

The present invention pertains to combustors for use in gas turbine engines, and more particularly for cooling systems therefor.

Combustors for use in gas turbine engines, particularly of the variety used to power aircraft, must be lightweight, stiff and reliable, as well as efficiently cooled. The combustor must be light enough in weight to permit the aircraft variety of these engines to successfully fly. The combustor wall, however, must also be substantial enough to withstand aerodynamic forces (resulting from the rapid expansion of oxidizing fuel within the combustion zone) as well as buckling forces associated with pressure drops created across the wall by a surrounding cooling fluid.

These combined design characteristics require that the combustor be formed of a thin and lightweight but strong material fabricated in a manner which provides substantial rigidity in both the radial and circumferential directions. One form of combustor includes an inner wall formed of a plurality of telescoping, overlapping annular hoops, where each hoop engages the adjacent upstream hoop in a substantially circular joint in order to define the combustion zone. Combustor walls of this variety have performed successfully in the past. However, the requirements of increased life and reliability have defined a need for combustor walls having increased strength and stiffness. Strengthening has been achieved by the addition of encircling "Z" rings, or by increasing combustor wall cross-sectional thickness. Each of these techniques has inherent disadvantages stemming from the weight factors involved. The present invention provides a reliable solution to this problem by substantially increasing combustor strength and stiffness without the necessity for added overall materials expenditure so that increased weight need not occur.

A contemporaneous problem has been that ever-increasing, nominal temperatures within the combustion zone result in a requirement for increasing the cooling of associated combustors. (The quantity of cooling fluid applied to various portions of gas turbine engines is inversely proportional to the overall engine efficiency; hence, methods for reducing quantities of cooling fluid used while increasing cooling efficiency are particularly important.)

Combustor wall cooling must counteract the heat transferred to the wall by convection and radiation from the hot combustion products in the combustion zone. In the past, convective heating of the liner has been reduced by maintaining a low boundary temperature through the addition of a film of cooling fluid to the heated side of the wall. For this purpose, combustor walls surrounded by cooling fluid plena have been supplied with apertures at appropriate positions for providing communication between the heated wall side and the cooling fluid plenum. The apertures have been formed in a manner to facilitate the formation of a cooling fluid film on the heated wall side.

To supplement the film cooling of combustor walls, the circumscribing cooling fluid plena are arranged so that the fluid therein removes heat from the wall by means of convective heat transfer. This variety of heat transfer is a function of the velocity of cooling fluid which engages the wall. Hence, it is desirable that the fluid velocity within a plenum which fluid engages the wall be relatively large. Unfortunately, high plenum fluid velocities result in large pressure losses creating overall inefficiencies. Furthermore, high fluid velocity within the plenum also affects detrimentally the uniformity of temperature profiles within a combustion zone adversely affecting combustion efficiency. For these and other reasons, it has been found unsatisfactory to provide large cooling fluid velocities throughout the plenum.

The present invention overcomes the foregoing limitations by providing combustor wall stiffening members which increase combustor rigidity for the purpose of increasing life and reliability, and which contemporaneously perform a valuable cooling function by means of directing cooling fluid onto the combustor wall in a plurality of high velocity streams for the purpose of increasing convective heat transfer therefrom. The overall effect of this latter characteristic is increased convective cooling efficiency of the cooling fluid with respect to the combustor without the necessity for increasing overall fluid velocity within the plenum.

BRIEF SUMMARY OF THE INVENTION

It is therefore a primary object of the present invention to provide a stiffening member for combustor walls in gas turbine engines which member does not add undesirably large weight increases to the walls.

It is a further object of the present invention to provide a combustor wall stiffener which also serves to effectively increase cooling efficiency with respect to the combustor wall.

These and other objects which will become apparent hereinafter are accomplished by the present invention which, in one form thereof, provides a combustor with a perforated encircling wall disposed in cooperation with a first combustor wall and an outer casing. The perforated wall directs cooling fluid from a plenum lying between the first wall and the outer casing in impinging, high velocity streams onto the radially outward side of the first wall for improved convective cooling thereof. A plurality of substantially circumferentially extending encircling ribs, which cooperate with the first and second walls, serve to compartmentalize a second plenum (formed between the first and second walls) so that the cooling fluid supplied to the individual compartments may be individually controlled. Apertures are provided within the first wall for communicating the combustion zone with the compartments for the purpose of exhausting cooling fluid from the compartments in a cooling film over the heated side of the first wall.

BRIEF DESCRIPTION OF THE DRAWING

The concepts of the present invention will be further elucidated by the following description, when taken in conjunction with the appended drawing wherein:

FIG. 1 is a section view of a gas turbine engine combustor incorporating the present invention;

FIG. 2 is an enlarged view of a portion of the combustor of FIG. 1 emphasizing portions of the present invention; and FIG. 3 is a section view of the combustor of FIG. 2 taken along line 3—3 of FIG. 2.

DETAILED DESCRIPTION OF A PREFERRED EMBODIMENT

While the concepts of the present invention are amenable to substantial modification and adaptation, the following is a preferred embodiment thereof.

FIG. 1 depicts a combustor of the variety which forms a portion of present gas turbine engines, in combination with the stiffening and cooling elements of the present invention. The combustor is generally designated 10, and is shown to be positioned downstream from a high pressure compressor stage 12 which supplies compressed air to cooling air plena 14 and 16 as well as to a primary air inlet 18. Combustion zone 20 is defined by combustor walls 22 and 24. Plenum 14 is defined by wall 22 in combination with an outer casing 26; while plenum 16 is defined by wall 24 along with a casing 28. At the upstream end of the combustion zone 20 is disposed a fuel carbureting device 30 which mixes fuel provided by fuel line 32 with primary air entering through inlet 18. The combustor 10 operates in the conventional manner wherein a mixture of fuel and primary air exiting carburetor 30 is ignited and burned within combustion zone 20, the products of combustion rapidly expanding and exiting to the right of FIG. 1 providing thrust to the left.

Combustor walls 22 and 24 may be seen in FIG. 1 to comprise telescoping, overlapping annular rings or hoops 22a and 24a respectively, with each hoop engaging the adjacent upstream or leftward hoop in a substantially circular joint at 22b and 24b and forming open-ended pockets 33 between adjacent hoops. These pockets are defined, in part, by overhanging lip 35 and the next downstream hoop 22a or 24a each of which includes a preformed spacer member 37 which serves to maintain the proper radial spacial relationship between telescoping hoops 22a and 24a. This combustor configuration has proven substantially satisfactory in present applications in withstanding the aerodynamic forces imposed upon the combustor walls by burning gases within combustor space 20 as well as the substantial buckling forces resulting from pressure differentials between plena 14 and 16 and combustion zone 20. However, for the purpose of increasing the life and reliability of combustor walls, the present invention provides additional lightweight stiffening members which also serve to increase cooling efficiency. In addition, the stiffening members according to the present invention permit walls 22 and 24 to be formed of thinner cross-sectional material than that which must be utilized in their absence. These characteristics will be discussed hereinafter.

Combustor wall cooling is accomplished in FIG. 1, in part, by the passing of cooling air from each plenum across the heated side of the combustor wall associated therewith. For example, wall 22 is provided with apertures 34 located near each circular joint 22b between adjacent hoops 22a. These apertures facilitate the flowing of the cooling air in a film upon the heated side of the combustor wall 22. As has been stated hereinabove, additional cooling of the walls is accomplished by convective heat transfer between the cooling air within the plena and the outward or unheated surfaces of the walls. The present invention also enhances wall cooling, as will be described.

Referring to FIGS. 2 and 3, the present invention is particularly emphasized. Each of these Figures treats a particular portion of the combustor 10 of FIG. 1; however, it will be noted that the treatment is substantially symmetrical about the combustor, similar elements being added at wall 24 as are hereinafter discussed with respect to wall 22.

To the structure of combustor wall 22 thus far described, the present invention adds a second wall 36 spaced apart from wall 22 and outer casing 26. Walls 22 and 36 combine to define a plenum 38 immediately adjacent wall 22. For the purpose of providing communication between plena 14 and 38, wall 36 bears a plurality of perforations 40. Through these perforations, pressurized air from plenum 14 is directed in high velocity, impinging streams upon wall 22 through plenum 38. This permits substantial increases in local cooling fluid velocity whereby convective heat transfer from wall 22 to the cooling fluid (air, in the present embodiment) may be substantially enhanced without increasing the overall fluid velocity within plenum 14 beyond desirable levels.

Due to this substantially increased fluid velocity with respect to the streams passing through perforations 40 and engaging wall 22, the heat transfer between this fluid and the wall is very high and provides good cooling. Furthermore, the convective cooling by such impinging streams is greater than can be generally achieved by the use of secondary air flowing parallel with the wall 22, as characterizes the prior art. This is true even in a situation where the parallel fluid flow would be of high velocity, since the impinging streams create turbulence near wall 22 which also enhances heat transfer. As a result, cooling of wall 22 may be accomplished by the use of reduced quantities of cooling fluid applied in this highly efficient fashion. This increases the overall efficiency of the associated gas turbine engine by an amount corresponding to the quantity of cooling air saved thereby.

In order to substantially increase the strength and stiffness of combustor wall 22, in addition to further enhancing cooling, the present invention provides a plurality of ribs 42 extending substantially between and cooperating with walls 22 and 38, and extending substantially circumferentially about wall 22. The ribs 42 are spaced axially with respect to one another and each engages an individual hoop 22a. By increasing the moment of inertia of wall 22 as well as by connecting wall 22 rigidly to wall 36, ribs 42 serve to increase the stiffness of wall 22 both circumferentially and radially. This characteristic permits the wall 22 to be formed of substantially thinner, lightweight material without sacrificing strength. Hence, the overall configuration described herein may weigh no more than present combustor walls but can result in substantially increased strength and stiffness. As has been stated, these characteristics are of importance due to present requirements for increased reliability and life of gas turbine engines.

A further characteristic of ribs 42 is that they are disposed and arranged so that, together with preselected portions of wall 22 and wall 36, the ribs divide plenum 38 into a plurality of individual and substantially isolated compartments 44. The compartmentalization of plenum 38 is a further particular benefit of the present invention in that, due to the isolation of one compartment from the others, the quantity of cooling air supplied to each compartment may be individually determined. By arranging and varying the number and size of perforations 40 which communicate an individual compartment 44 with plenum 14, a predetermined quantity of cooling air may be directed thereto. Correspondingly, different quantities may be directed to other compartments 44. In this way, an optimized cooling arrangement may be determined wherein localized heat concentrations within combustor wall 22 may be provided with larger quantities of cooling air from plenum 14 than other portions of wall 22 not subjected to heat concentrations. In this way, the maximum utilization may be made of the secondary air within plenum 14 issuing from compressor 12. As stated above, economization of cooling air results in increased overall engine efficiency.

In operation, the combustor incorporating the present invention functions as follows. Atmospheric air is pressurized by a compressor including compressor stage 12 from which the pressurized air is directed into the plena 14 and 16 as well as the primary air inlet 18. The primary air is mixed with fuel by carburetor 30 and burned within combustion zone 20. The cooling air within plenum 14 is directed across portions of wall 22, as described, in order to remove heat therefrom by conductive heat flow according to the present invention. As discussed above, the velocity of air within the plenum 14 is, of necessity, small in order to minimize friction and combustion losses and structural stresses. Nevertheless, due to the large aerodynamic stresses imposed upon wall 22 by the expansion of the burning fluid within the combustion zone 20, in addition to the buckling forces resulting from the pressure differential across wall 22, the wall is subjected to substantial stress, which may be advantageously alleviated by means of ribs 42 in cooperation with hoops 22a and wall 36. Radial and circumferential rigidity are added to wall 22 by increasing the moments of inertia thereof, and by reinforcing wall 22 by cooperation with perforated wall 36. Thus the aerodynamic and structural stresses upon wall 22 are counteracted by means of the present invention.

In order to enhance the cooling of wall 22 by convective heat transfer to the cooling air within plenum 14, the present invention also provides the perforations 40 of wall 36, which direct streams of high velocity cooling air from plenum 14 into plenum 38, and more particularly into the individual compartments 44 defined between ribs 42. The streams issuing from perforations 40 impinge wall 22, in the portions thereof associated with each compartment 44. The velocity of the impinging air improves heat transfer from wall 22 to the air; and its angle of attack, substantially normal to wall 22, serves to promote turbulence in the air which further improves heat transfer.

Disposition of the cooling air from compartments 44 is accomplished by exhausting the air through apertures 34 spaced circumferentially around each hoop 22a. The apertures are arranged and oriented in a fashion amenable to the production of a cooling film over the heated side of the hoop 22a downstream of each aperture 34. The cooling film defines a thermal boundary and prevents direct convective heat transfer from the products of combustion within combustion chamber 20 to hoops 22a.

As has been previously stated, the number and size of perforations 40, as well as the number and size of exit apertures 34, may be varied between individual compartments 44 in order to provide different quantities of cooling air to the various compartments according to the heat concentrations associated with their respective portions of wall 22. Provision of larger quantities of cooling air to those compartments associated with portions of wall 22 wherein heat concentrations are large, and corresponding decreases of cooling air directed to portions of wall 22 undergoing lesser heating, will allow substantially improved efficiency in the utilization of the cooling air provided to cool combustor 10. Such flexibility cannot be achieved by use of combustor cooling systems of the prior art, and is of substantial value with respect to ever-increasing efficiency demands made upon modern gas turbine engines.

While the present invention has been described particularly with respect to one embodiment thereof, those skilled in the art may readily vary the particular configuration disclosed here without departing from the concepts of the present invention. For example, ribs 42 may be any variety of cross member, and may be spaced apart in any desired fashion. Furthermore, all of the ribs need not extend across the entire distance between walls 22 and 36. Nor is it necessary for the wall 36 to be perforated, so long as it bears means for delivering impinging streams of cooling fluid to wall 22. These and other variations of the present invention are to be considered comprehended thereby.

What is claimed as new and desired to be secured by Letters Patent of the U.S. is:

1. A combustor for use in a gas turbine engine, comprising: a first wall defining a combustion zone, said first wall comprising a plurality of overlapping telescopically co-operating open ended hoops each having an upstream end and a downstream end with an integrally formed radially and circumferentially extending spacer portion rigidly connecting said ends and disposed therebetween, at least one of said hoops fixedly connected to and supported at its upstream and downstream ends against axial and radial movement by the next adjacent respective upstream and downstream hoop, said upstream end and said spacer portion of said one of said hoops overlapping the downstream end of said next adjacent upstream hoop such that a circumferentially extending gap is formed between said spacer portion and said downstream end of said next adjacent upstream hoop;

an outer casing partially defining a first cooling fluid plenum substantially circumscribing the first wall;

a second generally axially continuous wall spaced apart from the first wall and partially defining a second plenum;

a plurality of stiffening ribs disposed between the first and second walls and rigidly connecting said second wall to said hoops for dividing the second plenum into a plurality of circumferentially extending compartments substantially isolated axially from one another, each compartment bounding a preselected portion of the first wall;

a plurality of apertures in said spacer portion for providing communication between preselected of said compartments and said combustion zone for exhausting fluid from said compartments into said combustion zone along and parallel to the first wall; and a plurality of perforations of predetermined size in said second wall arranged according to a predetermined axial and radial spaced relationship for directing streams of cooling fluid into the compartments and directly against said first wall in individually controlled quantities.

2. The combustor of claim 1 wherein said spacer portion is disposed at the upstream end of said circumferential gaps forming, in cooperation therewith, open-ended pockets opening to the downstream direction and whereby said spacer portion further maintains a predetermined radial spacial relationship between adjacent cooperating open-ended hoops.

3. The combustor of claim 2 wherein said overlapped downstream end of said next adjacent upstream hoop includes a downstream lip cooperating with said spacer portion to form said circumferentially extending gap and said open-ended pocket.

4. The combustor of claim 3 wherein said lip directs said exhausting cooling fluid substantially along said first wall such that a film of cooling fluid is disposed thereon.

5. The combustor of claim 1 wherein the flow of fluid within said first cooling plenum, out of said circumferentially extending compartments and within said combustion zone are all in substantially the same direction.

* * * * *